United States Patent
Peng

(10) Patent No.: US 10,873,893 B1
(45) Date of Patent: Dec. 22, 2020

(54) WIRELESS MESH NETWORK FOR DYNAMICALLY CONFIGURING DATA ROUTING PATH BETWEEN TWO WIRELESS NODES

(71) Applicant: Realtek Singapore Pte. Ltd., Singapore (SG)

(72) Inventor: Haoxiang Peng, Singapore (SG)

(73) Assignee: REALTEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/558,528

(22) Filed: Sep. 3, 2019

(51) Int. Cl.
*H04W 40/12* (2009.01)
*H04W 24/10* (2009.01)
*H04L 12/24* (2006.01)
*H04W 84/18* (2009.01)

(52) U.S. Cl.
CPC ......... *H04W 40/12* (2013.01); *H04L 41/0816* (2013.01); *H04W 24/10* (2013.01); *H04W 84/18* (2013.01)

(58) Field of Classification Search
None
See application file for complete search history.

(56) References Cited

PUBLICATIONS

Taiwanese Office Action and Search Report for Taiwanese Application No. 109110019, dated Aug. 31, 2020.

*Primary Examiner* — James P Duffy
(74) *Attorney, Agent, or Firm* — Birch, Stewart, Kolasch & Birch LLP

(57) ABSTRACT

A wireless mesh network includes: a source wireless node, a destination wireless node, and one or more neighboring wireless nodes. The source wireless node is arranged to operably communicate in both a first frequency band and a second frequency band. The destination wireless node is arranged to operably communicate in both the first frequency band and the second frequency band. Each neighboring wireless node is arranged to operably communicate in both the first frequency band and the second frequency band. The source wireless node measures a received signal strength in a first frequency band, a rate of change of received signal strength of the first frequency band, and a rate of change of received signal strength of the second frequency band, and dynamically configures a data routing path from the source wireless node to the destination wireless node according to the measured results.

11 Claims, 3 Drawing Sheets

WIRELESS MESH NETWORK FOR DYNAMICALLY CONFIGURING DATA ROUTING PATH BETWEEN TWO WIRELESS NODES

BACKGROUND

The disclosure generally relates to a wireless mesh network (WMN) and, more particularly, to a wireless mesh network for dynamically configuring a data routing path between two wireless nodes within the wireless mesh network.

A wireless mesh network is a communication network constituted of multiple wireless nodes organized in a mesh topology. In operations, each wireless node within the wireless mesh network has to find a suitable data routing path in order to transmit data to another wireless node.

Although more and more wireless nodes are equipped with communication circuits capable of transmitting signals in two different frequency bands, e.g., 5 GHz and 2.4 GHz, a conventional wireless node only considers the signal paths in the same frequency band when selecting the data routing path. This is because the selection of data routing path will become very complicated if it involves the consideration of cross-band transmission. Therefore, it is apparent that the data routing path selected by the wireless node is usually not the best path for the wireless mesh network, which restricts the overall performance of the wireless mesh network.

SUMMARY

An example embodiment of a wireless mesh network is disclosed, comprising: a source wireless node, a destination wireless node, and one or more neighboring wireless nodes. The source wireless node comprises: a first wireless communication circuit, arranged to operably conduct signal communication in a first frequency band; a second wireless communication circuit, arranged to operably conduct signal communication in a second frequency band; and a first control circuit, coupled with the first wireless communication circuit and the second wireless communication circuit. The destination wireless node is arranged to operably conduct signal communication in both the first frequency band and the second frequency band. Each of the one or more neighboring wireless nodes is arranged to operably conduct signal communication in both the first frequency band and the second frequency band. The first control circuit is arranged to operably conduct following operations: measuring a received signal strength of the first wireless communication circuit to generate a current signal strength with respect to the first frequency band; if the current signal strength is less than a threshold strength, measuring a rate of change of received signal strength of the first wireless communication circuit to generate a first measurement value; measuring a rate of change of received signal strength of the second wireless communication circuit to generate a second measurement value; determining a target signal strength according to the first measurement value and the second measurement value; and dynamically configuring a data routing path from the source wireless node to the destination wireless node according to relative magnitude between the current signal strength and the target signal strength.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
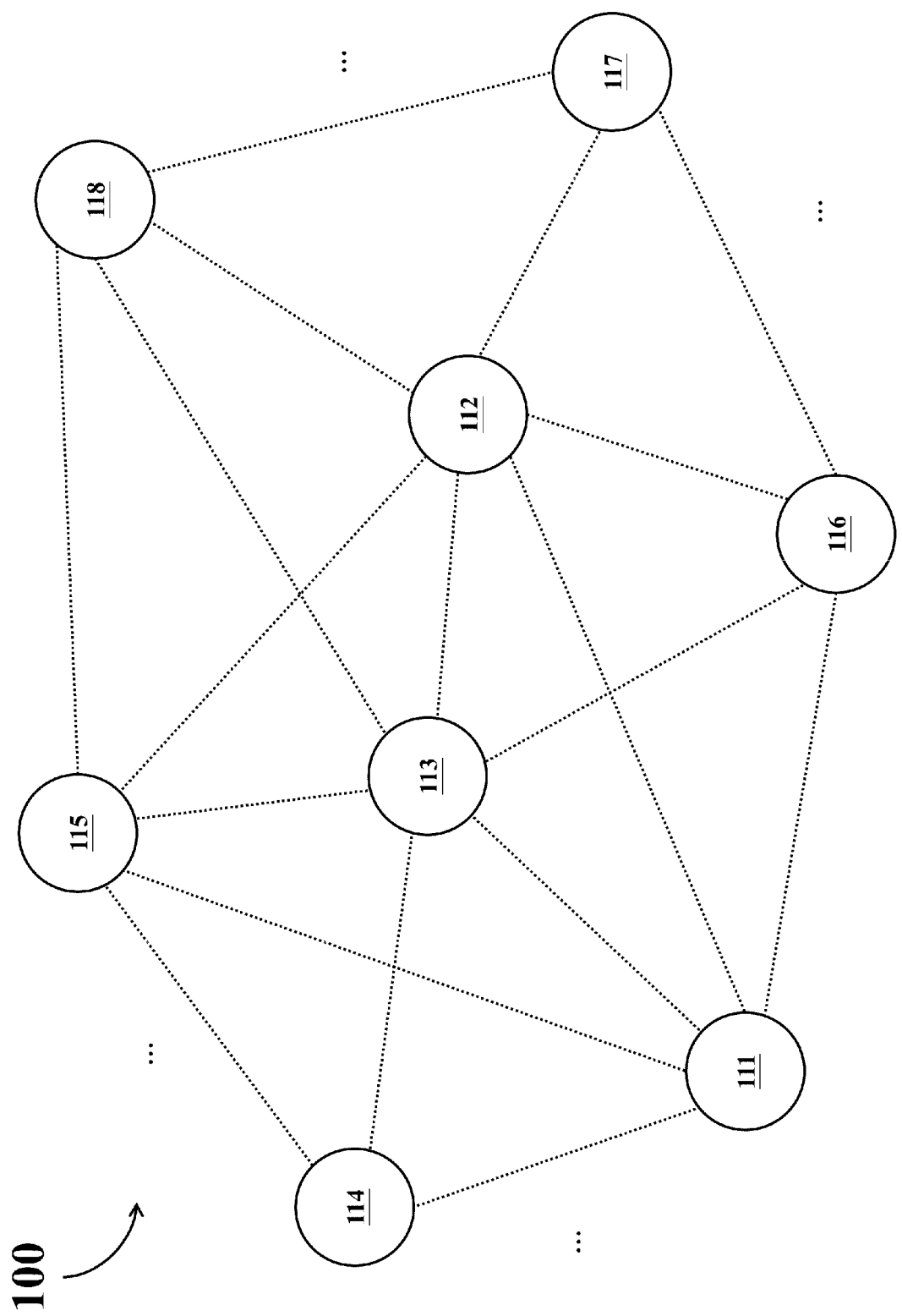
FIG. 1 shows a simplified functional block diagram of a wireless mesh network according to one embodiment of the present disclosure.

FIG. 1 shows a simplified functional block diagram of a wireless mesh network 100 according to one embodiment of the present disclosure. The wireless mesh network 100 comprises multiple wireless nodes organized in any fixed or dynamical mesh topology, such as the exemplary wireless nodes 111-118 as shown in FIG. 1. The quantity of the wireless nodes deployed in the wireless mesh network 100 depends upon the requirement of actual applications, and is not restricted to a particular number.

Each wireless node in the wireless mesh network 100 is capable of transmitting and receiving signals in two different frequency bands, e.g., 5 GHz and 2.4 GHz. In this embodiment, all of the wireless nodes in the wireless mesh network 100 may have a similar main circuit structure.

Figure 2:
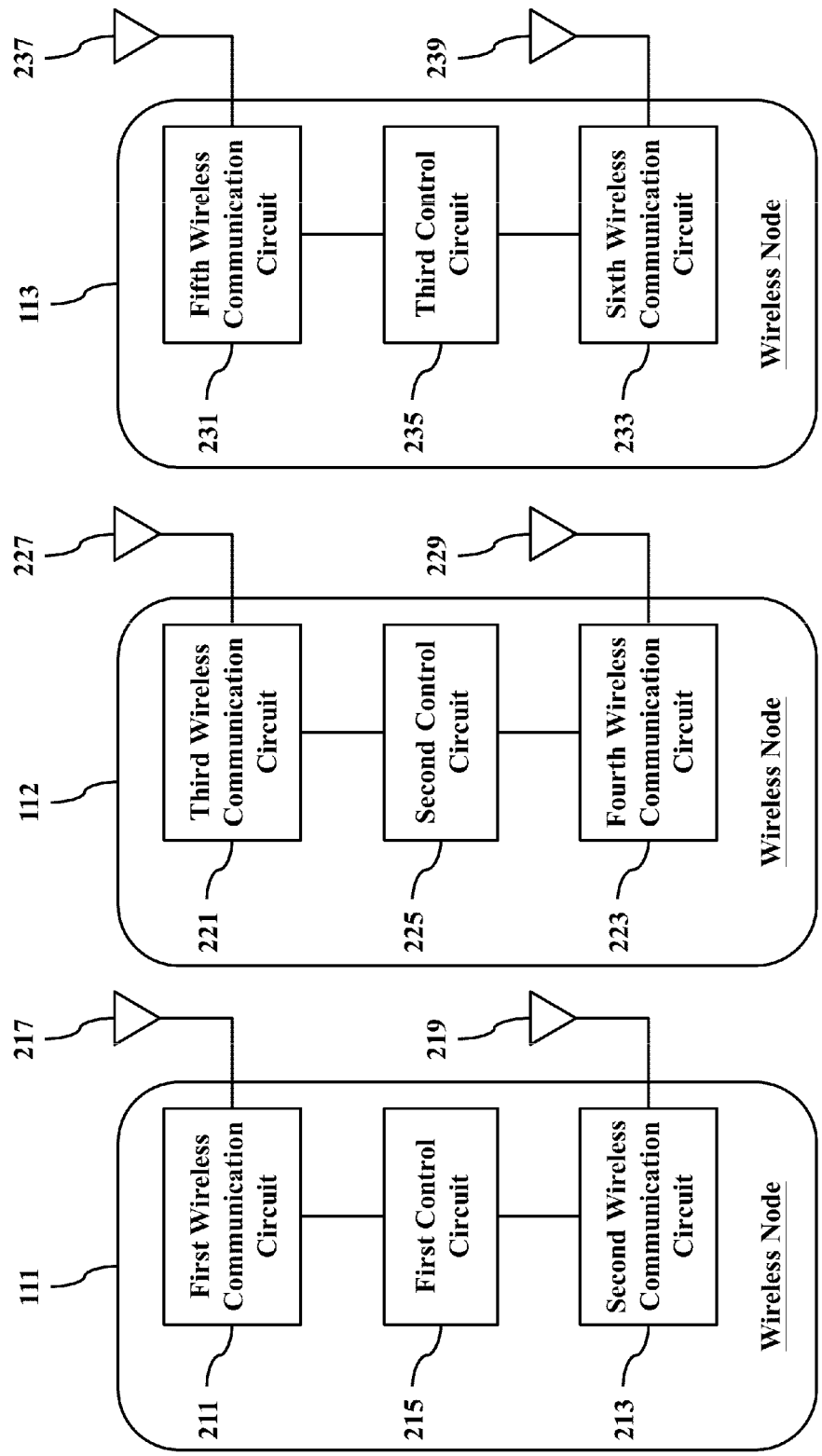
FIG. 2 shows simplified functional block diagrams of some wireless nodes in the wireless mesh network of FIG. 1 according to one embodiment of the present disclosure.

For example, FIG. 2 shows simplified functional block diagrams of the wireless nodes 111, 112, and 113 in the wireless mesh network 100 according to one embodiment of the present disclosure. As shown in FIG. 2, the wireless node 111 comprises a first wireless communication circuit 211 arranged to operably transmit and receive signal in the 5 GHz frequency band through an antenna 217; a second wireless communication circuit 213 arranged to operably transmit and receive signal in the 2.4 GHz frequency band through an antenna 219; and a first control circuit 215 coupled with the first wireless communication circuit 211 and the second wireless communication circuit 213, and arranged to operably control the operations of the wireless node 111. In practice, the antennas 217 and 219 may be realized with separate antenna components or may be integrated together.

The wireless node 112 comprises a third wireless communication circuit 221 arranged to operably transmit and receive signal in the 5 GHz frequency band through an antenna 227; a fourth wireless communication circuit 223 arranged to operably transmit and receive signal in the 2.4 GHz frequency band through an antenna 229; and a second control circuit 225 coupled with the third wireless communication circuit 221 and the fourth wireless communication circuit 223, and arranged to operably control the operations of the wireless node 112. Similarly, the antennas 227 and 229 may be realized with separate antenna components or may be integrated together.

The wireless node 113 comprises a fifth wireless communication circuit 231 arranged to operably transmit and receive signal in the 5 GHz frequency band through an antenna 237; a sixth wireless communication circuit 233 arranged to operably transmit and receive signal in the 2.4

GHz frequency band through an antenna 239; and a second control circuit 235 coupled with the fifth wireless communication circuit 231 and the sixth wireless communication circuit 233, and arranged to operably control the operations of the wireless node 113. Similarly, the antennas 237 and 239 may be realized with separate antenna components or may be integrated together.

In practice, each of the wireless communication circuits 211, 213, 221, 223, 231, and 233 may be realized with various suitable wireless transceiver circuits capable of supporting the communication protocols with respect to corresponding frequency bands. Each of the control circuits 215, 225, and 235 may be realized with one or more micro-controllers, micro-processors, or other application-specific integrated circuits (ASICs) having computing and data processing capability.

The main circuit structure of the rest wireless nodes in the wireless mesh network 100 is similar to the aforementioned wireless nodes 111, 112, and 113 as shown in FIG. 2. In practice, however, different wireless nodes may be provided with different additional circuit components. That is, it does not require all wireless nodes to have completely identical circuitry structure with each other.

In operations, each wireless node in the wireless mesh network 100 may need to transmit data to another wireless node from time to time. In this situation, the wireless node has to find a suitable data routing path for transmitting data to another wireless node.

In the following descriptions, a wireless node needs to transmit data is referred to as a source wireless node, and a wireless node to which the data is addressed is referred to as a destination wireless node. Additionally, wireless nodes located within the wireless signal communication range of the source wireless node are referred to as neighboring wireless nodes. Due to the natural of the mesh network topology, each wireless node in the wireless mesh network 100 may act as a source wireless node when it needs to transmit data to another wireless node, and may act as a destination wireless node when it receives data transmitted from another wireless node.

As is well known in related art, the wireless signal environment of respective wireless node may change with time. When a wireless node of the wireless mesh network 100 acts as a source wireless node, the source wireless node would consider the wireless signal environment of different frequency bands at the same time when selecting the data routing path, which is different from the conventional art.

Specifically, the source wireless node monitors the change of wireless signal environment in different frequency bands (e.g., the 5 GHz bands and 2.4 GHz bands of this embodiment) and takes the monitored result into consideration when it needs to select a data routing path for transmitting data.

As described previously, each wireless node in the wireless mesh network 100 is capable of transmitting and receiving data in two different frequency bands. This means that each wireless node may transmit data through the 5 GHz band or through the 2.4 GHz band. Accordingly, the data routing path between the source wireless node and the destination wireless node may be formed by one or more hops in the 5 GHz band, one or more hops in the 2.4 GHz band, or a combination of the above. In can be appreciated from the foregoing descriptions that there are many possible data routing paths can be selected between the source wireless node and the destination wireless node, and the quantity of possible data routing paths increase as the quantity of wireless nodes involved increase.

However, it is apparent that a wireless node would consume considerable computing resource and power if it evaluates all possible data routing paths and compares the evaluation results of all possible data routing paths with each other.

In order to reduce the required computing loading and power consumption, the source wireless node in the wireless mesh network 100 would adopt an economical strategy in selecting the data routing path. For illustrative purpose, it is assumed hereinafter that the source wireless node is the wireless node 111, and the destination wireless node is the wireless node 112. It is also assumed hereinafter that the destination wireless node 112 and wireless nodes 113-116 are located within a wireless transmission range of the first wireless communication circuit 211. In this situation, the wireless nodes 113-116 are neighboring wireless nodes of the source wireless node 111.

During the operations of the source wireless node 111, the first control circuit 215 dynamically measures a received signal strength of the first wireless communication circuit 211 to generate a current signal strength with respect to the 5 GHz band. For example, the first control circuit 215 may measure the signal strength of beacon signals or other broadcast signals transmitted from the destination wireless node 112 to the first wireless communication circuit 211, and generate a corresponding signal strength indicator to represent the current signal strength with respect to the 5 GHz band.

In addition, the first control circuit 215 also dynamically measures the wireless environment of both the first frequency band (e.g., the 5 GHz band in this embodiment) and the second frequency band (e.g., the 2.4 GHz band in this embodiment) to obtain a characteristic line for the first frequency band and a characteristic line for the second frequency band. In other words, the characteristic line for the first frequency band can be utilized for representing the current wireless environment of the first frequency band, and the characteristic line for the second frequency band can be utilized for representing the current wireless environment of the second frequency band.

For example, the first control circuit 215 may dynamically measure the rate of change of received signal strength of the first wireless communication circuit 211 to generate a first measurement value for representing the stability of the wireless signal environment in the 5 GHZ band. Meanwhile, the first control circuit 215 may dynamically measure the rate of change of received signal strength of the second wireless communication circuit 213 to generate a second measurement value for representing the stability of the wireless signal environment in the 2.4 GHZ band.

In practice, the current signal strength may be a moving average of the received signal strength of the first wireless communication circuit 211. The first measurement value may be a moving average of the rate of change of received signal strength of the first wireless communication circuit 211. Similarly, the second measurement value may be a moving average of the rate of change of received signal strength of the second wireless communication circuit 213.

Figure 3:
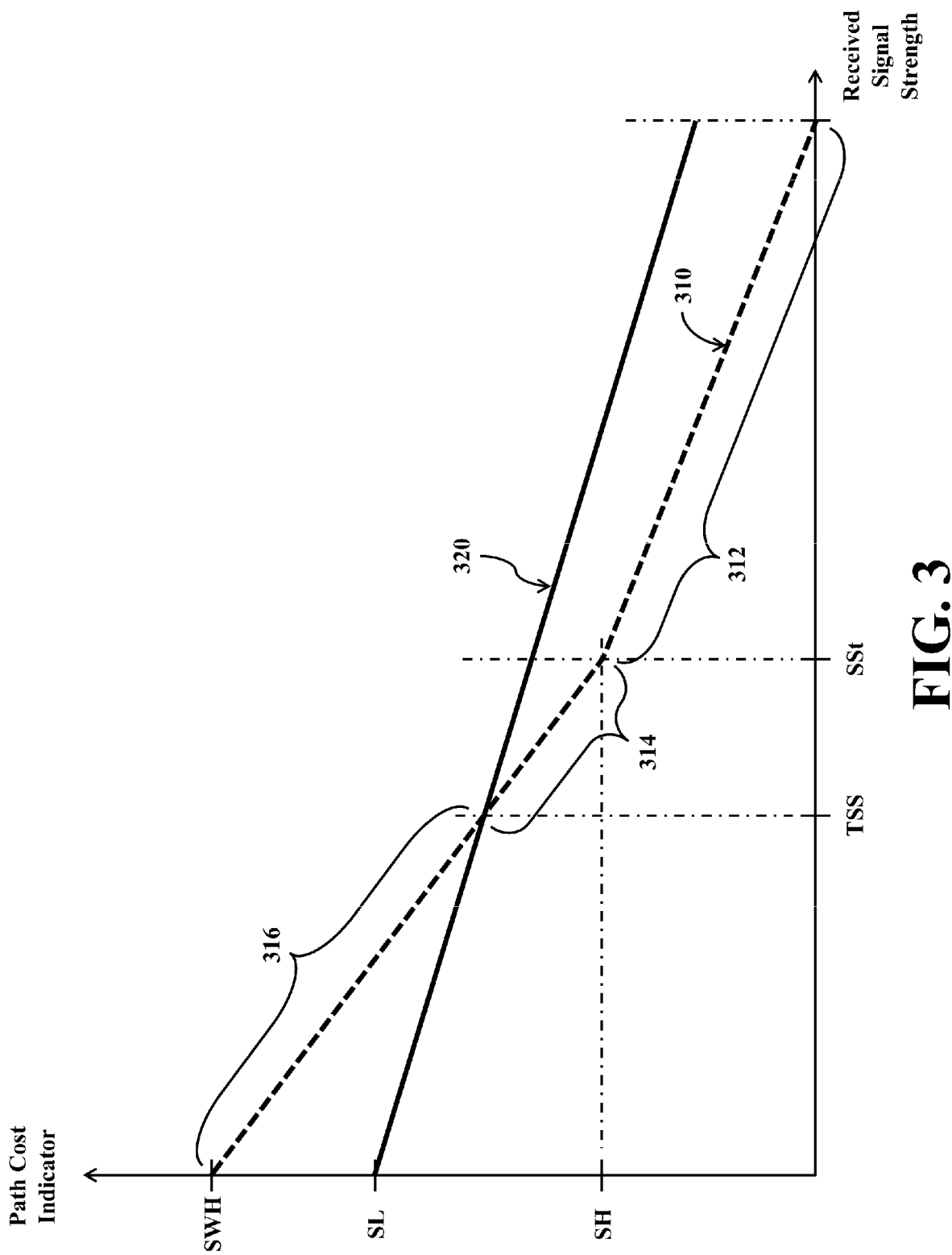
FIG. 3 shows a simplified schematic diagram illustrating characteristic lines for two different frequency bands of a source wireless node according to one embodiment of the present disclosure.

Please refer to FIG. 3, which shows a simplified schematic diagram illustrating characteristic lines for two different frequency bands of the source wireless node 111 according to one embodiment of the present disclosure.

In FIG. 3, a first characteristic line 310 represents the characteristic relationship between the path cost indicator and the received signal strength with respect to the 5 GHz band. A second characteristic line 320 represents the characteristic relationship between the path cost indicator and the received signal strength with respect to the 2.4 GHz band. The first characteristic line 310 is a broken line formed by a segment 312, a segment 314, and a segment 316, while the second characteristic line 320 is a straight line. SSt denotes the magnitude of a threshold strength, which corresponds to the signal strength of the intersection of the segment 312 and the segment 314. TSS denotes the magnitude of a target signal strength, which corresponds to the signal strength of the intersection of the first characteristic line 310 and the second characteristic line 320.

In the embodiment of FIG. 3, if the current signal strength is greater than the threshold strength, it means that the wireless environment of the 5 GHz band between the source wireless node 111 and the destination wireless node 112 is strong and ideal. In this situation, the characteristic relationship between the path cost indicator and the received signal strength with respect to the 5 GHz band may be represented by the following formula:

$$\text{Path Cost Indicator} = SH - Wss * Rssi \qquad \text{formula (1)}$$

wherein SH denotes a constant term corresponding to the 5 GHz band when the current signal strength is greater than the threshold strength; Wss denotes the rate of change of signal strength with respect to the 5 GHz band when the current signal strength is greater than the threshold strength; and Rssi denotes the received signal strength with respect to the 5 GHz band.

Above formula (1) can be represented by the segment 312 of the first characteristic line 310 as shown in FIG. 3.

On the other hand, if the current signal strength is less than a threshold strength, it means that the wireless environment of the 5 GHz band between the source wireless node 111 and the destination wireless node 112 is relative weak and may be not very ideal. In this situation, the characteristic relationship between the path cost indicator and the received signal strength with respect to the 5 GHz band may be represented by the following formula:

$$\text{Path Cost Indicator} = SWH - Wws * Rssi \qquad \text{formula (2)}$$

wherein SWH denotes a constant term corresponding to the 5 GHz band when the current signal strength is less than the threshold strength; and Wws denotes the rate of change of signal strength with respect to the 5 GHz band when the current signal strength is less than the threshold strength.

Above formula (2) can be represented by the segments 314 and 316 of the first characteristic line 310 as shown in FIG. 3.

In the embodiment of FIG. 3, the characteristic relationship between the path cost indicator and the received signal strength with respect to the 2.4 GHz band may be represented by the following formula:

$$\text{Path Cost Indicator} = SL - Ws * Rssi \qquad \text{formula (3)}$$

wherein SL denotes a constant term corresponding to the 2.4 GHz band; and Ws denotes the rate of change of signal strength with respect to the 2.4 GHz band.

The magnitude of the constant term SWH in formula (2) is greater than the magnitude of the constant term SL in above formula (3).

It can be appreciated from the previous descriptions, in this embodiment, Wss in above formula (1) also denotes the rate of change of signal strength of the first wireless communication circuit 211 when the current signal strength is greater than the threshold strength; Wws in above formula (2) also denotes the rate of change of signal strength of the first wireless communication circuit 211 when the current signal strength is less than the threshold strength; and Ws in above formula (3) also denotes the rate of change of signal strength of the second wireless communication circuit 213.

In FIG. 3, lower path cost indicator represents better wireless signal environment. As shown in FIG. 3, the path cost indicator of the 5 GHz band has a broken line relation with respect to the received signal strength. When the current signal strength is greater than the target signal strength, the first characteristic line 310 is below the second characteristic line 320, which means that the current wireless signal environment of the 5 GHz band is relatively better than the current wireless signal environment of the 2.4 GHz band. On the other hand, when the current signal strength is less than the target signal strength, the first characteristic line 310 is above the second characteristic line 320, which means that the current wireless signal environment of the 5 GHz band is relatively worse than the current wireless signal environment of the 2.4 GHz band.

Accordingly, if the magnitude of the current signal strength is greater than magnitude SSt of the threshold strength when the source wireless node 111 needs to transmit data to the destination wireless node 112, the first control circuit 215 may simply select a direct hop in the 5 GHz band to form the data routing path from the source wireless node 111 to the destination wireless node 112. That is, the first control circuit 215 would control the first wireless communication circuit 211 to directly transmit data to the destination wireless node 112 through the antenna 217, without using other intermediate nodes.

On the other hand, if the magnitude of the current signal strength is less than magnitude SSt of the threshold strength, the first control circuit 215 may calculate the magnitude TSS of target signal strength, and compare the magnitude of the current signal strength with the magnitude TSS of the target signal strength to determine the strategy of selecting the data routing path.

Specifically, as can be seen from the above formula (2) and formula (3), the path cost indicator with respect to the 5 GHz band at the target signal strength may be represented by the following formula:

$$SWH - Wws * TSS = SL - Ws * TSS \qquad \text{formula (4)}$$

By shifting the items of the formula (4), the following formula can be obtained:

$$TSS = SWH - SL/Wws - Ws \qquad \text{formula (5)}$$

It can be appreciated from the above formula (5), when the magnitude of the current signal strength is less than magnitude SSt of the threshold strength, the first control circuit 215 can calculate the magnitude TSS of target signal strength based on the rate of change of signal strength with respect to the 5 GHz band (i.e., Wws) and the rate of change of signal strength with respect to the 2.4 GHz band (i.e., Ws).

In most situation, the target signal strength is less than the threshold strength.

In this embediment, if the magnitude of the current signal strength is greater than the magnitude TSS of the target signal strength, the first control circuit 215 may select one or multiple hops in the 5 GHz band to form the data routing path from the source wireless node 111 to the destination wireless node 112, and does not consider other possible data routing paths in the 2.4 GHz band. For example, the first control circuit 215 may control the first wireless communication circuit 211 to directly transmit data to the destination wireless node 112 through the antenna 217, without using other intermediate nodes. Alternatively, the first control circuit 215 may control the first wireless communication circuit 211 to transmit data to one of the neighboring wireless nodes 113-116 and ask the neighboring wireless node to direct or indirectly transmit the data to the destination wireless node 112 in the 5 GHz band.

If the magnitude of the current signal strength is smaller than the magnitude TSS of the target signal strength, the first control circuit 215 may select one or multiple hops in the 2.4 GHz band to form the data routing path from the source wireless node 111 to the destination wireless node 112, and does not consider other possible data routing paths in the 5 GHz band. For example, the first control circuit 215 may control the second wireless communication circuit 213 to directly transmit data to the destination wireless node 112 through the antenna 219, without using other intermediate nodes. Alternatively, the first control circuit 215 may control the second wireless communication circuit 213 to transmit data to one of the neighboring wireless nodes 113-116 and ask the neighboring wireless node to direct or indirectly transmit the data to the destination wireless node 112 in the 2.4 GHz band.

The source wireless node 111 may change the data routing path to the destination wireless node 112 from time to time depending upon the most updated wireless signal environment of the two frequency bands.

In order to avoid changing the data routing path too frequently, the first control circuit 215 may configure a predetermined time limit for the duration of the current data routing path to the destination wireless node 112, and does not replace the current data routing path within the predetermined time limit. As a result, unnecessary change of the data routing path can be avoided.

As it can be appreciated from the foregoing descriptions, the first control circuit 215 of the source wireless node 111 monitors the wireless environment of both the 5 GHz band and the 2.4 GHz band to dynamically determine the target signal strength, and decides the data routing path selection strategy based on the comparison result of the current signal strength and the target signal strength.

In this way, the source wireless node 111 is enabled to take the wireless signal environment of two different frequency bands into consideration at the same time, but does not need to consume considerable computing resource and power to compare the evaluation results of all possible data routing paths with each other.

As a result, the approach disclosed above not only simplifies the operation of selecting data routing path, but also significantly reduces the computing loading and power consumption of the source wireless node 111 while increasing the selection speed and selection efficiency of the data routing path.

The rest wireless nodes in the wireless mesh network 100 may adopt the approach disclosed above to select the data routing path when they need to transmit data to other wireless nodes.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to compass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A wireless mesh network (100), comprising:
    a source wireless node (111), comprising:
        a first wireless communication circuit (211), arranged to operably conduct signal communication in a first frequency band (5G);
        a second wireless communication circuit (213), arranged to operably conduct signal communication in a second frequency band (2.4G); and
        a first control circuit (215), coupled with the first wireless communication circuit (211) and the second wireless communication circuit (213);
    a destination wireless node (112), arranged to operably conduct signal communication in both the first frequency band and the second frequency band; and
    one or more neighboring wireless nodes (113-116), each arranged to operably conduct signal communication in both the first frequency band and the second frequency band;
    wherein the first control circuit (215) is arranged to operably conduct following operations:
        measuring a received signal strength of the first wireless communication circuit (211) to generate a current signal strength with respect to the first frequency band;
        if the current signal strength is less than a threshold strength, measuring a rate of change of received signal strength of the first wireless communication circuit (211) to generate a first measurement value;
        measuring a rate of change of received signal strength of the second wireless communication circuit (213) to generate a second measurement value;
        determining a target signal strength according to the first measurement value and the second measurement value; and
        dynamically configuring a data routing path from the source wireless node (111) to the destination wireless node (112) according to relative magnitude between the current signal strength and the target signal strength.

2. The wireless mesh network (100) of claim 1, wherein the destination wireless node (112) and the one or more neighboring wireless nodes (113-116) are located within a wireless transmission range of the first wireless communication circuit (211).

3. The wireless mesh network (100) of claim 2, wherein if the current signal strength is greater than the target signal strength, the first control circuit (215) selects one or multiple hops in the first frequency band to form the data routing path from the source wireless node (111) to the destination wireless node (112).

4. The wireless mesh network (100) of claim 3, wherein if the current signal strength is smaller than the target signal strength, the first control circuit (215) selects one or multiple hops in the second frequency band to form the data routing path from the source wireless node (111) to the destination wireless node (112).

5. The wireless mesh network (100) of claim 3, wherein the target signal strength is determined by the following formula:

$$TSS=(SWH-SL)/(Wws-Ws)$$

wherein TSS denotes a magnitude of the target signal strength; SWH denotes a constant term corresponding to the first frequency band when the current signal strength is less than the threshold strength; SL denotes a constant term corresponding to the second frequency band; Wws denotes a magnitude of the first measurement value when the current signal strength is less than the threshold strength; while Ws denotes a magnitude of the second measurement value.

6. The wireless mesh network (100) of claim 5, wherein a magnitude of the constant term SWH is greater than a magnitude of the constant term SL.

7. The wireless mesh network (100) of claim 6, wherein the target signal strength is less than the threshold strength.

8. The wireless mesh network (100) of claim 3, wherein the target signal strength is less than the threshold strength.

9. The wireless mesh network (100) of claim 3, wherein if the current signal strength is greater than the threshold strength, the first control circuit (215) selects a single hop in the first frequency band to form the data routing path from the source wireless node (111) to the destination wireless node (112).

10. The wireless mesh network (100) of claim 3, wherein the current signal strength is a moving average of the received signal strength of the first wireless communication circuit (211), the first measurement value is a moving average of the rate of change of received signal strength of the first wireless communication circuit (211), while the second measurement value is a moving average of the rate of change of received signal strength of the second wireless communication circuit (213).

11. The wireless mesh network (100) of claim 3, wherein the first control circuit (215) does not change the data routing path within a predetermined time limit.

\* \* \* \* \*